United States Patent [19]

Rohlinger

[11] 4,070,764
[45] Jan. 31, 1978

[54] LEVEL AND COLLAPSIBLE RULER

[76] Inventor: Daniel P. Rohlinger, W220 N3197 Springdale Road, Pewaukee, Wis. 53072

[21] Appl. No.: 749,600

[22] Filed: Dec. 10, 1976

[51] Int. Cl.² .............................................. G01C 9/18
[52] U.S. Cl. ........................................ 33/342; 33/376
[58] Field of Search ................. 33/342, 370, 371, 372, 33/373, 376

[56] References Cited

U.S. PATENT DOCUMENTS

| 2,720,705 | 10/1955 | Vincent | 33/342 |
| 2,956,795 | 10/1960 | Foster | 33/138 X |
| 3,242,578 | 3/1966 | Moll | 33/342 X |
| 3,568,319 | 3/1971 | Moll | 33/376 X |

Primary Examiner—Charles E. Phillips
Attorney, Agent, or Firm—Henry C. Fuller

[57] ABSTRACT

A combination collapsible ruler and level includes a pre-stressed coilable and uncoilable spring strip ruler with a level tube mounting block mounted intermediate the strip ends. The mounting block has a foot portion which engages the supporting surface to make the spring strip self-supporting on a surface with the level tube in the proper plane. When collapsed the spring strip forms two coils which abut adjacent the level mounting block to provide for convenient handling.

3 Claims, 4 Drawing Figures

U.S. Patent  Jan. 31, 1978  4,070,764
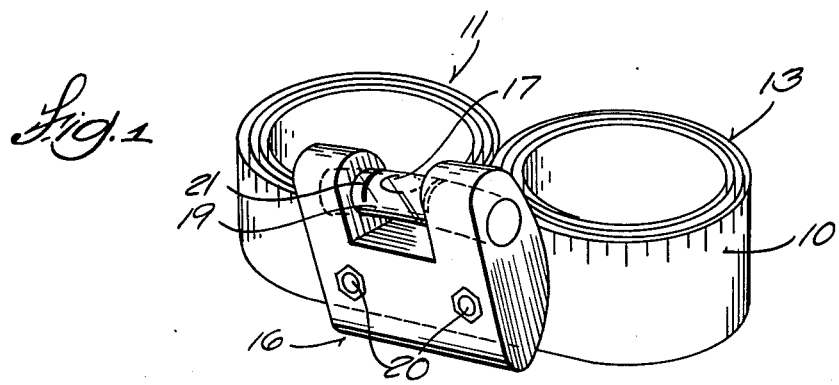
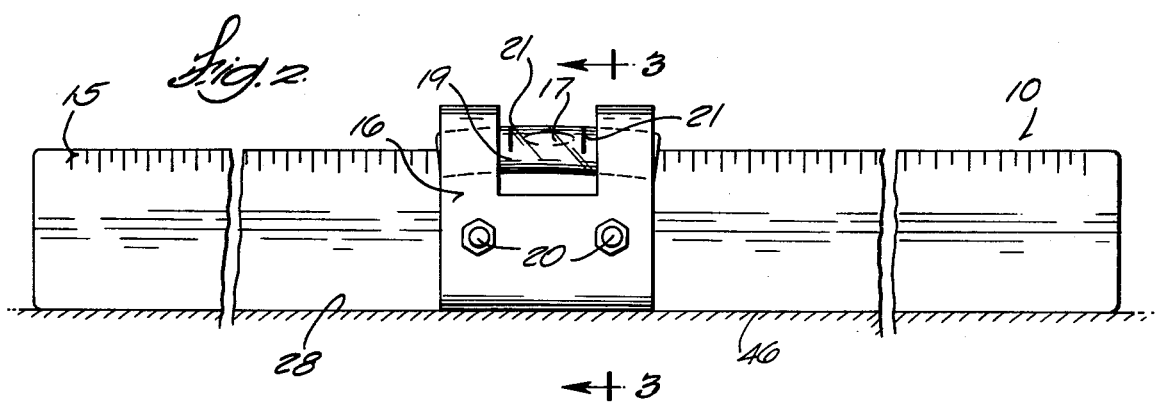
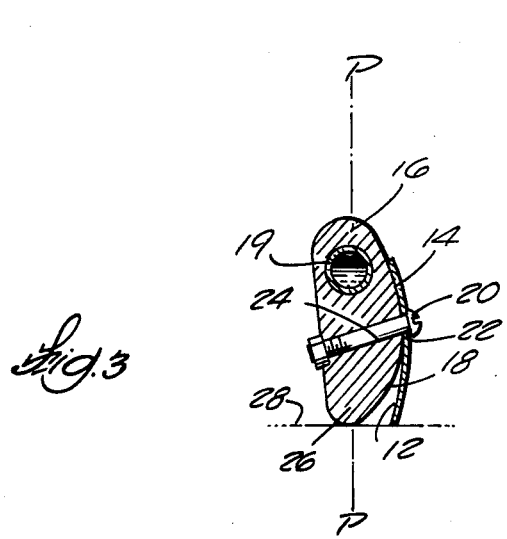
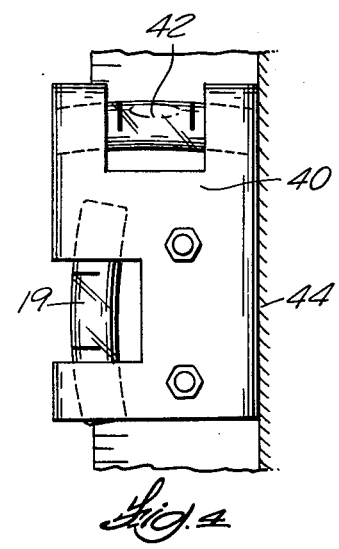

LEVEL AND COLLAPSIBLE RULER

BACKGROUND OF INVENTION

The invention provides a compact collapsible ruler, level combination which is easily carried in a pocket. The ruler spring strip is of conventional construction such as that shown in U.S. Pat. No. 2,956,795 which has a concave, convex cross-section and is permanently stressed to form a plurality of convolutions or coils when collapsed. The mounting block for the level tube has a surface complementary to the concave side of the spring strip to provide a mounting surface. The mounting block can be fastened by bolts or the like to the strip. A foot portion on the mounting block is adapted to engage a supporting surface and support the spring strip and level tube when in use. The level tube is arranged with respect to the mounting block and spring strip so that a plane through the center of the tube and through the arc of curvature will be normal to the supporting surface when the strip and level are in use.

Further objects, advantages and features of the invention will become apparent from the disclosure.

DESCRIPTION OF DRAWINGS

FIG. 1 is a perspective view of the combination ruler, level of the invention.

FIG. 2 is a side elevational view of the level and ruler shown in FIG. 1.

FIG. 3 is a sectional view along line 3—3 of FIG. 2.

FIG. 4 is a side view of a modified embodiment which includes a vertical level tube.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings FIG. 1 discloses a spring steel strip 10 which has a concave surface 12 and a convex surface 14. The strip 10 is permanently stressed so that it will form two tightly wound coils 11 and 14 when the strip is collapsed. The strip 10 is provided with suitable measuring indicia 15.

In accordance with the invention there is provided a level tube 19 which is upwardly convex. The tube 19 contains the usual fluid and a bubble 17. Centering marks 21 are also provided on the tube 19. Means are provided for mounting the level tube on the strip 10. In the disclosed construction the mounting means comprises a block 16 which has a convex surface 18 complementary in shape to the concave surface 12 of the strip 10 to provide a mounting surface. Bolts 20 extending through apertures 22 in the spring strip 10 and apertures 24 in the mounting block secure the block 16 to the strip.

The mounting block 16 has a foot portion 26 which is adapted to touch the supporting surface 28 and provide a free-standing ruler, level combination. The foot 26 is positioned so that a plane PP through the arc of the tube 30 and center of the tube 19 will be normal or at right angles to the surface 28 for accurate level readings.

FIG. 4 shows a modified embodiment of the invention in which a mounting block 40 contains the horizontal level tube 19 and a vertical level tube 42 at one end of the mounting block 40. Thus leveling of a vertical surface such as surface 44 can be accomplished as well as horizontal leveling of the surface 46.

I claim:

1. A combination collapsible ruler and level comprising a coilable spring strip having a formed concave, convex cross-section and spaced edges permanently stressed to form a plurality of tightly wound convolutions when the stressed strip is collapsed and a linear ruler when uncoiled, on arcuate level tube, and mounting means for mounting said level tube on said spring strip intermediate the ends of the strip and said mounting means having a convex surface complementary to said concave strip surface and having a foot portion for engaging a supporting surface at a point spaced from the lower edge of the strip to cooperate with one of said strip edges to provide bipodal support for the strip and level when in an uncoiled condition so that a plane through the tube arc is normal to the surface upon which said strip and level combination are supported.

2. The combination of claim 1 wherein said mounting means is centered between the ends of said strip so that when folded there are two coils of said strip of equal size on each side of said mounting means.

3. The combination of claim 1 wherein said mounting means includes a block interfitting with said concave surface and fasteners connecting said block to said strip.

* * * * *